(12) United States Patent
Weitzel et al.

(10) Patent No.: US 9,988,020 B2
(45) Date of Patent: Jun. 5, 2018

(54) WASHER NOZZLE FOR A SCREEN WASH SYSTEM

(71) Applicant: Continental Automotive GmbH, Hannover (DE)

(72) Inventors: Heiko Weitzel, Schenklengsfeld-Hilmes (DE); Dirk Ringler, Friedewald-Motzfeld (DE); Michael Droessler, Eschwege (DE)

(73) Assignee: Continental Automotive GmbH (DE)

( * ) Notice: Subject to any disclaimer, the term of this patent is extended or adjusted under 35 U.S.C. 154(b) by 0 days. days.

(21) Appl. No.: 15/140,690

(22) Filed: Apr. 28, 2016

(65) Prior Publication Data

US 2016/0318486 A1    Nov. 3, 2016

(30) Foreign Application Priority Data

Apr. 29, 2015  (DE) ........................ 10 2015 207 940

(51) Int. Cl.
| | |
|---|---|
| *B60S 1/52* | (2006.01) |
| *B05B 1/10* | (2006.01) |
| *B05B 1/08* | (2006.01) |
| *F16K 15/14* | (2006.01) |

(52) U.S. Cl.
CPC .................. *B60S 1/52* (2013.01); *B05B 1/10* (2013.01); *F16K 15/14* (2013.01)

(58) Field of Classification Search
CPC ...... B60S 1/46; B60S 1/48; B60S 1/52; B05B 1/08; B05B 1/10; F16K 15/14; F16K 15/145; F16K 15/147
USPC ........................ 239/284.1, 284.2, 589.1, 600
See application file for complete search history.

(56) References Cited

U.S. PATENT DOCUMENTS

| | | | | |
|---|---|---|---|---|
| 5,636,794 A | * | 6/1997 | Hess ......................... | B05B 1/08 137/539 |
| 6,460,780 B1 | | 10/2002 | Zimmer | |
| 6,463,621 B1 | | 10/2002 | Zimmer | |
| 6,978,951 B1 | * | 12/2005 | Raghu ....................... | B05B 1/08 239/284.1 |
| 2003/0234303 A1 | * | 12/2003 | Berning .................... | B05B 1/08 239/589.1 |
| 2004/0251315 A1 | * | 12/2004 | Maruyama .............. | B05B 1/042 239/284.1 |
| 2005/0028849 A1 | * | 2/2005 | Fukushima ............... | B05B 1/08 134/198 |
| 2006/0278738 A1 | * | 12/2006 | Steerman .............. | B05B 1/3006 239/570 |
| 2007/0257133 A1 | * | 11/2007 | Bettenhausen ........... | B60S 1/52 239/284.1 |
| 2010/0078509 A1 | * | 4/2010 | Utz .......................... | B05B 1/08 239/590 |
| 2011/0292212 A1 | * | 12/2011 | Tanabe ..................... | B05B 1/08 348/148 |

FOREIGN PATENT DOCUMENTS

| | | |
|---|---|---|
| DE | 19906197 | 8/2000 |
| DE | 19912975 | 9/2000 |
| DE | 102006031713 | 1/2008 |
| DE | 202010001821 | 7/2011 |

* cited by examiner

*Primary Examiner* — Darren W Gorman
(74) *Attorney, Agent, or Firm* — RatnerPrestia

(57) ABSTRACT

A washer nozzle for a screen wash system of a motor vehicle has a pre-assembled structural unit of a jet insert and a check valve. This structural unit is pressed into a shaft of a housing. This makes the washer nozzle particularly easy to install.

12 Claims, 2 Drawing Sheets

WASHER NOZZLE FOR A SCREEN WASH SYSTEM

CROSS REFERENCE TO RELATED APPLICATIONS

This application claims priority to German Patent Application No. 10 2015 207 940.6, filed Apr. 29, 2015, the contents of such application being incorporated by reference herein.

FIELD OF THE INVENTION

The invention concerns a washer nozzle for a screen wash system of a motor vehicle, with a housing, with a jet insert inserted in the housing and sealed against this, with a connection for a washing fluid line for supplying screen washing fluid, with a water outlet of the jet insert for spraying washing fluid, and with a check valve blocking the back flow of the washing fluid from the water outlet to the connection.

BACKGROUND OF THE INVENTION

Such washer nozzles are often used in screen wash systems of modern motor vehicles and are known in practice for cleaning windscreens, rear windows or headlamp lenses. The washer nozzle generates a jet of washing fluid depending on the shape of the jet insert. The check valve prevents the washing fluid from running back when the screen wash system is at rest. Such a back flow would lead to greatly delayed response of the screen wash system on restart.

A washer nozzle is known in practice in which a check valve is arranged directly behind the connection of the housing. For this, the check valve has a catch connection and a seal in the connection. The disadvantage with this washer nozzle is that it is very complex to construct and install.

SUMMARY OF THE INVENTION

An aspect of the invention is based on refining a washer nozzle of the type cited initially so that it is particularly easy to install.

This problem is achieved according to an aspect of the invention in that the jet insert with the check valve is configured as a pre-assembled structural unit.

With this design, the structural unit of the check valve and housing can easily be joined together for final installation of the washer nozzle. This substantially facilitates installation of the washer nozzle. The check valve with the jet insert also forms a structural unit which is simple to install.

According to a further advantageous refinement of the invention, the check valve has particularly few components and can be installed particularly easily if the jet insert has a valve connector, the valve connector has a channel, the channel is guided from an opening facing the housing to an opening facing the water outlet, and one of the openings is closed by an elastic membrane.

According to a further advantageous refinement of the invention, installation of the washer nozzle is simplified further if the membrane is fixedly clamped on the valve connector. With this configuration, in the simplest case the check valve with the one membrane requires only a single component for the check valve.

According to a further advantageous refinement of the invention, the check valve is structured particularly simply if the opening of the channel facing the washer outlet is arranged on a casing surface of the valve connector, and the membrane surrounds the valve connector in the region of the opening facing the water outlet.

According to a further advantageous refinement of the invention, installation of the washer nozzle is simplified further if the jet insert comprises the valve connector with the channel.

According to a further advantageous refinement of the invention, the check valve is structured particularly simply if the valve connector has a round cross section and the membrane is formed as a hose and is pushed over the valve connector.

According to a further advantageous refinement of the invention, the washer nozzle can be produced particularly economically if the membrane is made of a rubber elastic material.

According to another advantageous refinement of the invention, the pretension force of the check valve can be set particularly easily if the hose-like membrane has a slot next to the opening facing the water outlet.

According to a further advantageous refinement of the invention, the seal of the housing and the guidance of the washing fluid through the channel are structured particularly simply if the housing has a sealing seat against the free end of the valve connector.

According to a further advantageous refinement of the invention, installation of the washer nozzle is simplified further if the jet insert has a press fit in a shaft of the housing.

The washer nozzle allows the distribution of the washing fluid jet over a wide spray area if the washer nozzle is configured to generate an oscillating jet of washing fluid. This configuration means that only a small number of jet inserts is required to clean a large surface area, which simplifies installation of the washer nozzle. Washer nozzles for generating an oscillating jet of washing fluid are often known as fluidic nozzles and are known in practice.

BRIEF DESCRIPTION OF THE DRAWINGS

Aspects of the invention allow for numerous embodiments. To clarify the basic principle further, one of these is shown in the drawing and described below. The drawings show.

DETAILED DESCRIPTION OF THE PREFERRED EMBODIMENTS

Figure 1:
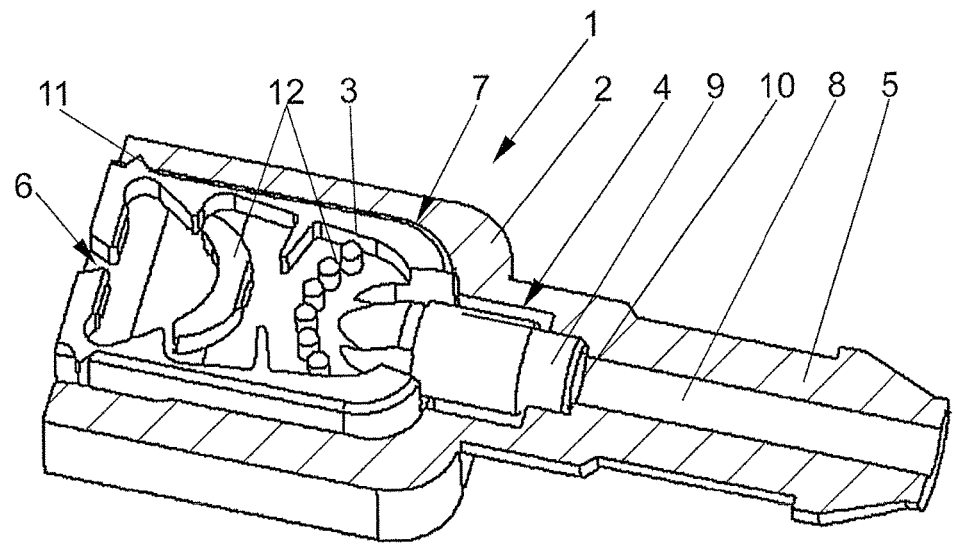
FIG. 1 a longitudinal section through a washer nozzle provided for installation in a motor vehicle, FIG. 2 a jet insert of the washer nozzle from FIG. 1 with a check valve before installation, FIG. 3 a housing and a structural unit of the washer nozzle before installation.

FIG. 1 shows a washer nozzle 1 provided for installation in a motor vehicle, with a housing 2 and a jet insert 3 and a check valve 4. The housing 2 has a connection 5 for connection of a washing fluid line (not shown). A water outlet 6 for spraying washing fluid is arranged on the jet insert 3. The housing 2 has a shaft 7 for receiving the jet insert 3, and a washing fluid channel 8 guided up to the check valve 4. The check valve 4 has a valve connector 9, at the free end of which a sealing seat 10 against the washing fluid channel 8 of the housing 2 is arranged. The jet insert 3, close to the water outlet 6, also has a sealing seat 11 against the housing 2. Various elements 12 are arranged in the jet insert 3 to generate an oscillating jet of washing fluid.

The housing 2 may furthermore have catch hooks (not shown) for fixing in the motor vehicle, or receivers for a heating device (also not shown). Evidently, the housing 2 may also comprise several shafts 7 for receiving several jet inserts 3.

Figure 2:
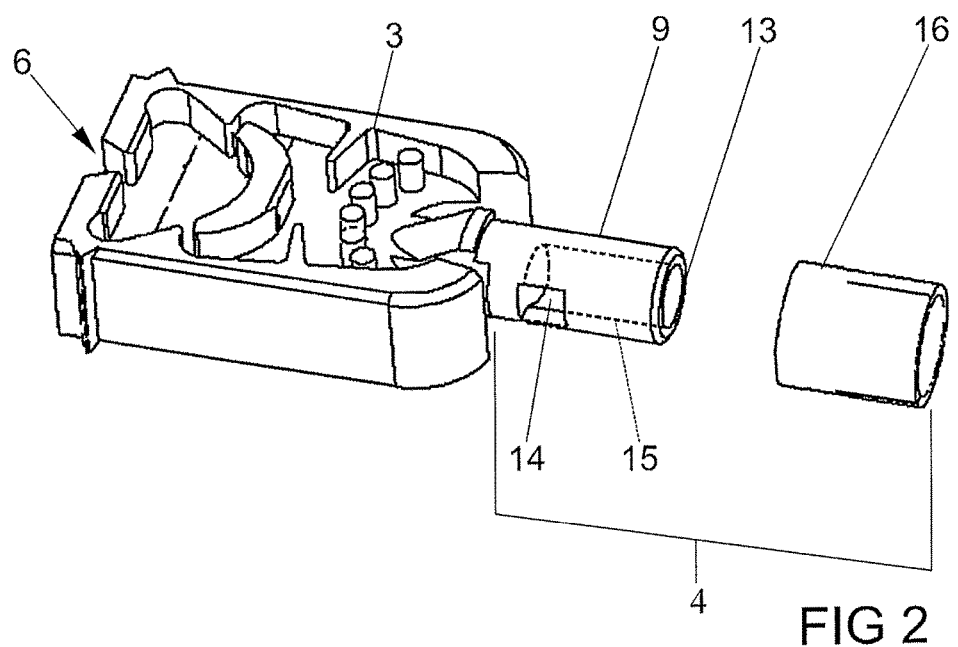

FIG. 2 shows a jet insert 3 with individual components of the check valve 4 shown in FIG. 1 before installation. It is evident here that the jet insert 3 is produced integrally with the valve connector 9. The valve connector 9 has a channel 15 guided from an opening 13 facing the housing 2 to an opening 14 facing the water outlet 6. The opening 14 facing the water outlet 6 is arranged on the casing surface of the valve connector 9. The check valve 4 has a hose-like rubber elastic membrane 16 which is pushed over the valve connector 9 for installation, and in the mounted state shown in FIG. 1 covers the opening 14 facing the water outlet 6. After being pushed on, the membrane 16 is fixedly clamped to the valve connector 9.

Figure 3:
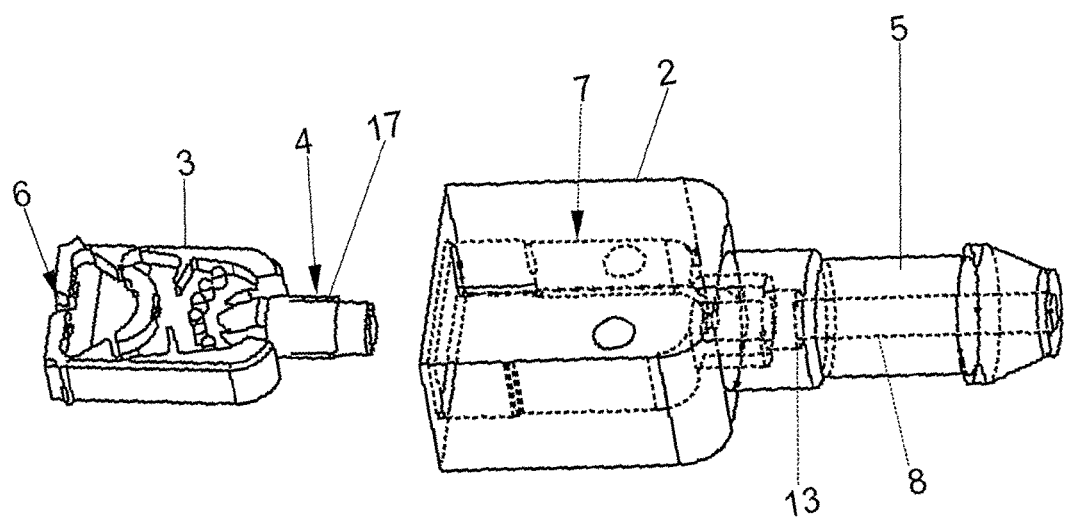

FIG. 3 shows a pre-assembled structural unit of a jet insert 3 and check valve 4 before installation in the housing. In the exemplary embodiment shown, the membrane 16 has a slot 17. In another exemplary embodiment (not shown), the membrane 16 may also be configured without a slot, as a thin-walled hose piece corresponding to the proposed pre-tension force. For installation, this structural unit of jet insert 3 and check valve 4 is simply introduced into the shaft 7 of the housing 2 and held by means of a press fit on the sealing seats 10, 11 described in FIG. 1.

When washing fluid is introduced into the housing 2 via the connection 5 shown in FIG. 1, it reaches—via the washing fluid channel 8—the opening 13 of the check valve 4 facing the housing 2. Via the channel 15 in the valve connector 9, the washing fluid then reaches the opening 14 in the valve connector 9 facing the water outlet 6. The membrane 16, covering the opening 14 in the valve connector 9 facing the water outlet 6, is pressed radially outwards under the pressure of the washing fluid so that the washing fluid reaches the elements 12 in the jet insert 3. These elements 12 at the water outlet 6 generate an oscillating jet of washing fluid. When no washing fluid is conveyed, the membrane 16 lies on the valve connector 9 and closes the opening 14 facing the water outlet 6. Thus no air can enter the washing fluid channel 8.

The invention claimed is:

1. A washer nozzle for a screen wash system of a motor vehicle, comprising:
   a housing;
   a jet insert inserted in the housing and sealed against the housing;
   a connection having a washing fluid channel for supplying screen washing fluid;
   a water outlet of the jet insert for spraying washing fluid; and
   a check valve configured to block a back flow of the washing fluid from the water outlet to the connection, the check valve consisting of:
      a valve connector integrally connected with the jet insert, wherein the valve connector has a channel, the channel extending from a first opening of the valve connector distal from the housing to a second opening of the valve connector distal from the first opening and closer to the water outlet than the first opening; and
      an elastic membrane,
   wherein the second opening of the valve connector closer to the water outlet is covered by the elastic membrane of the check valve,
   wherein the second opening of the valve connector is adjacent an interior entry to the jet insert for flow of the washing fluid from the connection through the check valve to the water outlet, and
   wherein the flow of the washing fluid from the connection through the check valve to the water outlet consists of:
      the washing fluid flowing in a first direction from the washing fluid channel through the first opening and channel of the valve connector, and exiting the channel through the second opening of the valve connector in a second direction substantially perpendicular to the first direction,
      the elastic membrane expands under a pressure of the flow of the washing fluid from the second opening of the valve connector, and
      the flow of the washing fluid from the expanded elastic membrane enters the jet insert directly through the interior entry of the jet insert in the first direction.

2. The washer nozzle as claimed in claim 1, wherein the membrane is fixedly clamped on the valve connector.

3. The washer nozzle as claimed in claim 1, wherein the second opening of the valve connector is arranged on a casing surface of the valve connector and the elastic membrane surrounds the valve connector in the region of the second opening of the valve connector.

4. The washer nozzle as claimed in claim 1, wherein the valve connector has a round cross section and the elastic membrane is configured as a hose and is pushed over the valve connector.

5. The washer nozzle as claimed in claim 4, wherein the elastic membrane is made from a rubber elastic material.

6. The washer nozzle as claimed in claim 4, wherein the hose-like membrane has a slot next to the second opening of the valve connector.

7. The washer nozzle as claimed in claim 1, wherein the housing has a sealing seat against a free end of the valve connector.

8. The washer nozzle as claimed in claim 1, wherein the jet insert has a press fit in a shaft of the housing.

9. The washer nozzle as claimed in claim 1, wherein the washer nozzle further comprises a plurality of elements arranged within the jet insert between the second opening of the valve connector and the water outlet of the jet insert, the plurality of elements configured to generate an oscillating jet of the washing fluid.

10. The washer nozzle as claimed in claim 2, wherein the second opening of the valve connector is arranged on a casing surface of the valve connector, and the elastic membrane surrounds the valve connector in the region of the second opening of the valve connector.

11. The washer nozzle as claimed in claim 5, wherein the hose-like membrane has a slot next to the second opening of the valve connector.

12. The washer nozzle as claimed in claim 1, wherein the jet insert and the check valve are configured as a pre-assembled structural unit.

* * * * *